UNITED STATES PATENT OFFICE.

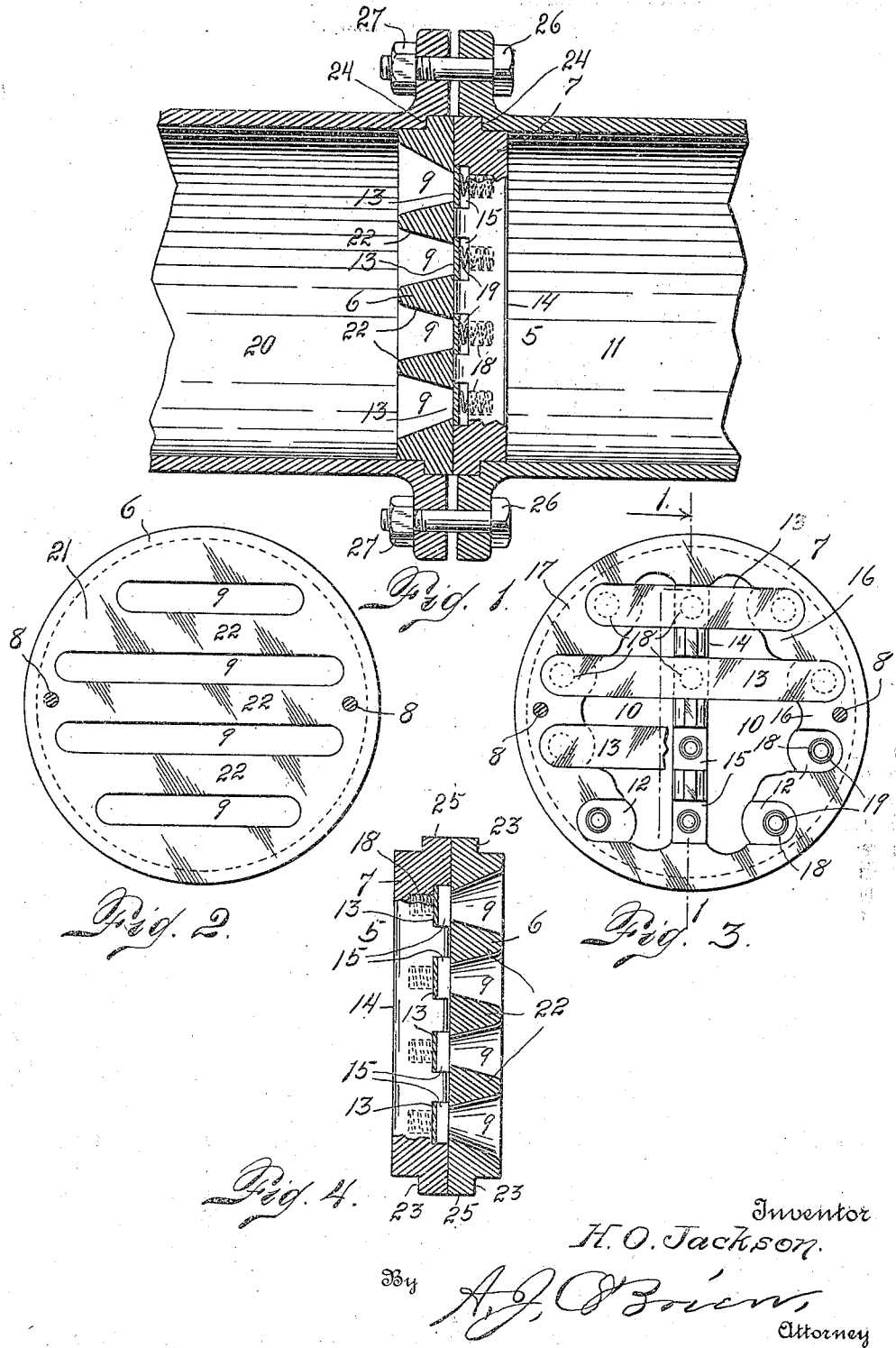

HENRY O. JACKSON, OF DENVER, COLORADO, ASSIGNOR TO THE JACKSON COMPRESSOR COMPANY, OF DENVER, COLORADO.

CHECK-VALVE.

1,268,720.   Specification of Letters Patent.   Patented June 4, 1918.

Application filed November 20, 1916. Serial No. 132,261.

*To all whom it may concern:*

Be it known that I, HENRY O. JACKSON, a citizen of the United States, residing at the city and county of Denver and State of Colorado, have invented certain new and useful Improvements in Check-Valves; and I do declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates to improvements in check valves, the object being to provide a simple and mechanical device adapted to efficiently perform the aforesaid function. The present improvement is well adapted for use in connection with air compressors and is so constructed that it controls a port having a relatively large cross-sectional area thus distributing the pressure and therefore reducing the wear incident to this pressure to a large extent, whereby the efficient durability of the construction is greatly increased.

This application covers an improvement upon the invention claimed in my copending application Serial No. 98,296 filed May 18, 1916.

Generally speaking the improved construction is composed of two relatively heavy members having passages through which the air passes during the operation of the compressor for instance. The passage of the air is controlled by means of thin, flat members which are adapted to cover the inlet passages of one member hereinafter referred to as the valve seat member being normally held in place and in the closed position by the back pressure of the air in the receiver, though it may be preferable to employ springs which act upon the said controlling devices to normally retain them in the seated position, and to quickly reseat them as soon as the air pressure is released though these springs are not essential to the operation of the structure as will be readily understood. These thin valve parts or pieces are long as compared with their width and move bodily and equally throughout their entire length, their extremities and central portions engaging recesses formed in one of the casing members hereinafter refererd to as the valve cage member. The opposite or valve seat member of the casing and in which the inlet passages are formed, is smooth on its inner face or that adjacent the recesses of the cage casing member in which the valve pieces are arranged. The face of this member can be ground down from time to time to make an absolute air tight seal. The cage member of the casing in which the valve pieces are retained is provided with an opening divided by partitions into two or more passages which are normally in communication with the air pressure in the receiver, thus the back pressure in the receiver acts on the valve pieces to close the inlet passages of the companion member except when the intake pressure is greater and acts upon said valve pieces. During the air compressing operation, for instance, the air passing through the inlet passages of the corresponding valve seat member acts upon the relatively thin, flat, long valve pieces to force them away from the inlet passages and cause them to retreat into the recesses of the opposite casing or valve cage member, thus allowing the air from each inlet passage to take a diagonal course and pass through the exit passages of the valve cage member.

Having briefly outlined my improvement the same will now be described in detail, reference being made to the accompanying drawing, in which is illustrated an embodiment thereof.

In the drawing:

Figure 1 is a central longitudinal section taken through a conduit in which one embodiment of the present invention is located and arranged in operative relation, the section being taken on the line 1—1 of Fig. 3.

Fig. 2 is an inner face view of the valve seat member of the casing, being the one provided with the inlet valve passages.

Fig. 3 is an inner face view of the other member of the casing which may be termed the valve cage member, and Fig. 4 is a sectional view of the invention similar to the one shown in Fig. 1 with the relative position of the parts reversed.

Let the numeral 5 designate the improved check valve considered in its entirety and consisting of two casing members 6 and 7 which, when the parts are assembled, are connected by means of screws 8. The member 6 may be termed the inlet member as it contains passages 9 which the air, for instance, enters during the compressing operation; and the member 7 may be termed the exit member as it contains passages 10 which the air traverses on its way to the receiver, which passages 10 are continuously open to or in communication with the receiver or the conduit 11 between the check valve and the receiver (not shown). The cage member 7 is provided with recesses 12 adapted to receive the opposite extremities of valve pieces 13, the recesses being shaped to conform with the outline of the corresponding valve pieces, but sufficiently large to allow these pieces to move freely therein as is required in order that they may properly perform their function. As illustrated in the drawing, the two casing members 6 and 7 are circular in shape in face view as indicated in Figs. 2 and 3. Hence, the various recesses 12 and their corresponding valve pieces 13, vary in length, the central pair of valve pieces 13 being longer than the outer end pieces on either side thereof. As shown in the drawing, there are four of these valve pieces 13 and a corresponding number of recesses 12, though it is to be understood that the invention is not limited to any precise or particular number of valve pieces and their corresponding recesses. Each recess 12 has a depth considerably greater than the thickness of its corresponding valve piece 13 in order to allow the latter an appreciable movement in the recess during the opening and closing action of the valve pieces, and in order to allow a free flow of fluid from the exit extremities of the inlet passages 9 to the inlet extremities of the exit passages 10. The valve cage member 7 is provided with a centrally disposed transverse partition 14 arranged at right angles to the length of the valve pieces 13 and provided with a series of depressions or recesses 15 of corresponding depth to the recesses 12. Thus a central support is provided for the valve pieces 13 in addition to the end supports provided by the recesses 12. A plurality of these partitions may be provided according to the size and shape of the check valve. The valve pieces 13 as illustrated in the drawing, are composed of long, narrow thin pieces of steel, their opposite edges being parallel between rounded or semicircular extremities which correspond in shape with the ends of the recesses 12 which the valve pieces occupy. The recesses 12 are properly speaking, provided only at the opposite ends of the valve pieces and are spaced by facing parts 16 which are flush with the flat circumferential face 17 of the valve cage member 7.

Each of the recesses 12 and each of the recesses 15 is counter-bored to provide a circular opening 18 adapted to receive spiral springs 19 which act upon the valve pieces to normally hold them in the closed position shown in Fig. 1, this condition existing when the pressure is cut off from the inlet conduit 20 and exit conduit 11. These springs further insure a quick closing or reseating of the valves as soon as the pressure on the inlet side is relieved.

The valve seat member 6 of the valve casing has its face 21 flat and all in a single plane. This surface may be ground down to provide a smooth air tight seal. This inner face of the casing member 6 engages and fits closely against the area 16 and rim 17 of the entire face portion of the inner surface of the valve cage member 7. This valve seat member 6 of the casing has its face broken only by the inlet passages 9 which are of the same area or approximately of the same area (being slightly smaller) than the valve pieces 13. The passages 9 are spaced by partitions 22.

When the valve is in use it may be held in place between two conduit members 11 and 20 as shown in Fig. 1, the casing members 6 and 7 having shoulders 23 which are engaged by adjacent shoulders 24 formed on the two conduit members. In other words, the adjacent extremities of the two members are circumferentially recessed to receive a circumferential projection 25 formed on the valve casing, considering the latter in its entirety. The conduit members 11 and 20 as illustrated in the drawing, are connected by bolts 26 fastened by nuts 27, whereby the valve is securely held in coöperative relation with the conduit members. Any other means may be provided for maintaining the check valve in its proper position within the conduit.

As the check valve is used in Fig. 1 the stream of air or fluid passes in the direction of the arrow A from the inlet side 20 to the outlet side 11 of the conduit, but should the direction of travel of the air be reversed the check valve in its entirety may be removed and replaced in a reversed position, such as is illustrated in Fig. 4.

From the foregoing description the use and operation of the improved check valve will be readily understood. Assuming that it is positioned as shown in Fig. 1, and, assuming that it is employed in connection with an air compressor, the air will enter the passages 9 of the casing 6, and act upon the valve pieces 13, to force them away from the exit extremities of the passages 9, in opposition to the action of the spiral springs 19. The air will then pass first out of its course laterally and thence through the passages 10 of the casing 7 into the conduit 11 which is in communication with the receiver not shown.

Having described my invention what I claim is:

A check valve comprising a two-part casing, one part having inlet passages separated by a partition, the other part having outlet passages separated by a partition arranged at right angles to the partition of the first named part, recesses transversely arranged in the inner faces of the partition and lateral portions of the second named part, and flat valve pieces arranged in said recesses to extend at right angles to said partition of the second named part and adapted to cover said inlet passages, whereby the outlet side of intermediate portions of the valves are exposed.

In testimony whereof, I affix my signature in presence of two witnesses.

HENRY O. JACKSON.

Witnesses:
   HELEN A. VILLEMAGNE,
   C. E. PARSONS.